(12) United States Patent
Yang (10) Patent No.: US 9,725,081 B2
(45) Date of Patent: Aug. 8, 2017

(54) ELECTRONIC BRAKE SYSTEM

(71) Applicant: MANDO CORPORATION, Gyeonggi-do (KR)

(72) Inventor: I-Jin Yang, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/006,081

(22) Filed: Jan. 25, 2016

(65) Prior Publication Data

US 2016/0214591 A1 Jul. 28, 2016

(30) Foreign Application Priority Data

Jan. 26, 2015 (KR) .................. 10-2015-0011859

(51) Int. Cl.
*B60T 13/68* (2006.01)
*B60T 7/04* (2006.01)
(Continued)

(52) U.S. Cl.
CPC ............ *B60T 13/686* (2013.01); *B60T 7/042* (2013.01); *B60T 8/4018* (2013.01);
(Continued)

(58) Field of Classification Search
CPC ...... B60T 13/686; B60T 7/042; B60T 8/4081; B60T 8/4018; B60T 13/662;
(Continued)

(56) References Cited

U.S. PATENT DOCUMENTS 5,026,124 A * 6/1991 Resch ....................... B60T 8/88
180/197
7,983,827 B2 * 7/2011 Nakada ................. B60T 8/3655
303/121

(Continued)

FOREIGN PATENT DOCUMENTS

JP 2009-137564 6/2009
JP 2014-61835 4/2014
(Continued)

OTHER PUBLICATIONS

Office Action dated Oct. 28, 2015 for Korean Patent Application No. 10-2015- 0011859.
(Continued)

*Primary Examiner* — Thomas J Williams
*Assistant Examiner* — Mariano Sy
(74) *Attorney, Agent, or Firm* — Ladas & Parry, LLP (57) ABSTRACT

An electronic brake system may include a hydraulic pressure supply device having a motor configured to be operated by receiving an electrical signal from the pedal displacement sensor when the brake pedal is operated, a gear pump configured to discharge and suction a hydraulic pressure depending on a rotational force of the motor, and a power transmission unit configured to deliver the rotational force of the motor to the gear pump; a hydraulic control unit having first and second hydraulic circuits configured to receive the hydraulic pressure by a force generated by the hydraulic pressure supply device to control hydraulic pressure flows delivered to wheel cylinders provided on wheels; and an electronic control unit configured to control the motor and valves based on hydraulic pressure information and pedal displacement information.

10 Claims, 7 Drawing Sheets

(51) Int. Cl.
  *B60T 8/40* (2006.01)
  *B60T 13/14* (2006.01)
  *B60T 13/66* (2006.01)
  *B60T 13/74* (2006.01)
  *B60T 17/02* (2006.01)

(52) U.S. Cl.
  CPC .......... *B60T 8/4081* (2013.01); *B60T 13/146* (2013.01); *B60T 13/662* (2013.01); *B60T 13/745* (2013.01); *B60T 17/02* (2013.01)

(58) Field of Classification Search
  CPC ...... B60T 13/745; B60T 17/02; B60T 13/146; B60T 13/142; B60T 8/4031
  USPC .... 303/10, 11, 15, 113.4, 119.1, 116.4, 9.62, 303/186, 187, 188, DIG. 6
  See application file for complete search history.

(56) References Cited

U.S. PATENT DOCUMENTS

| | | | | |
|---|---|---|---|---|
| 2005/0088039 | A1* | 4/2005 | Yang | B60T 8/4031 303/11 |
| 2011/0241419 | A1* | 10/2011 | Ohkubo | B60T 1/10 303/9.62 |
| 2012/0025599 | A1* | 2/2012 | Park | B60T 7/042 303/6.01 |
| 2012/0091787 | A1 | 4/2012 | Nishino et al. | |
| 2013/0049449 | A1* | 2/2013 | Watanabe | B60T 1/10 303/3 |
| 2013/0186083 | A1* | 7/2013 | Hatano | B60T 8/4081 60/571 |
| 2013/0221734 | A1* | 8/2013 | Osaki | B60T 13/20 303/10 |
| 2013/0239567 | A1* | 9/2013 | Ohnishi | B60T 7/042 60/545 |
| 2015/0021981 | A1* | 1/2015 | Shimada | B60T 13/146 303/121 |
| 2015/0061358 | A1* | 3/2015 | Maruo | B60T 8/17 303/3 |
| 2016/0221560 | A1* | 8/2016 | Yang | B60T 13/686 |

FOREIGN PATENT DOCUMENTS

| | | |
|---|---|---|
| KR | 10-2011-0011938 | 2/2011 |
| KR | 10-2013-0104160 | 9/2013 |
| KR | 10-1392840 | 5/2014 |

OTHER PUBLICATIONS

Notice of Allowance dated Jun. 21, 2016 for Korean Patent Application No. 10-2015-0011859 and its English translation provided by Applicant's foreign counsel.

* cited by examiner

ELECTRONIC BRAKE SYSTEM

CROSS-REFERENCE TO RELATED APPLICATION

This application claims the priority to Korean Patent Application No. 10-2015-0011859, filed on Jan. 26, 2015 in the Korean Intellectual Property Office, the disclosure of which is incorporated herein by reference in its entirety.

BACKGROUND

1. Field

Embodiments of the present invention relate to an electronic brake system, and more particularly, to an electronic brake system capable of a structure simplification and a precise pressure control.

2. Description of the Related Art

A brake system for braking is necessarily mounted on a vehicle, and in recent years, a variety of systems for providing stronger and more stable braking forces have been proposed. For example, there are brake systems such as an anti-lock brake system (ABS) for preventing wheel slid while braking, a brake traction control system (BTCS) for preventing driving wheels from being slipped when a vehicle is suddenly or rapidly accelerated, a vehicle dynamic control system (VDC) for stably maintaining a driving state of a vehicle by combining the ABS with a traction control to control hydraulic pressure of a brake, and the like.

Such an electronic brake system includes multiple solenoid valves for controlling a brake hydraulic pressure delivered to wheel cylinders mounted on wheels of a vehicle, a pair of a low-pressure accumulator and a high-pressure accumulator for temporarily storing oil discharged from the wheel cylinders, a motor and a pump for forcibly pumping oil in the low-pressure accumulator, multiple check valves for preventing a backflow of oil, and an electronic control unit (ECU) for controlling the solenoid valves and a driving of the motor, and these components are compactly installed in a hydraulic block made of aluminum. Also, a hydraulic pressure supply device is provided and used for delivering pressure to the wheel cylinders by receiving a driver's intention to brake in the form of an electrical signal from a pedal displacement sensor that measures a displacement of a brake pedal when the driver steps on the brake pedal.

An electronic brake system provided with such a hydraulic pressure supply device is disclosed in U.S. Patent Laid-open Application Publication No. 2012/0091787. According to the disclosure, the hydraulic pressure supply device is made for operating a motor depending on a pedal effort of a brake pedal to generate a braking pressure. At this time, the braking pressure is generated by converting a rotational force of the motor into a linear motion to press a piston.

However, the electronic brake system with such a structure has a problem that it is difficult to produce a rapid pressure generation and perform a precise control due to a single-acting structure of the hydraulic pressure supply device in which a pressurized piston is returned again to its original position to be operated when a pressure is regenerated or a generated pressure is boosted.

Further, there are problems that multiple valves are required and a passage structure is complicated in order to electronically control the brake system and to perform a variety of functions.

SUMMARY

Therefore, it is an aspect of the present invention to provide an electronic brake system capable of providing a required hydraulic pressure continuously and constantly as well as a precise pressure control using a gear pump provided in a hydraulic pressure supply device.

Also, it is another aspect of the present invention to provide an electronic brake system capable of minimizing the number of valves for controlling hydraulic pressure flows to implement a simplified configuration, and providing braking by a pedal effort of a driver even when a brake system operates abnormally.

In accordance with one aspect of the present invention, an electronic brake system, which has a reservoir storing oil, a master cylinder having first and second hydraulic ports and coupled to the reservoir so as to receive the oil, a pedal displacement sensor sensing a displacement of a brake pedal, and a simulation device connected to the master cylinder to provide a reaction force corresponding to a pedal effort of the brake pedal, includes: a hydraulic pressure supply device having a motor configured to be operated by receiving an electrical signal from the pedal displacement sensor when the brake pedal is operated, a gear pump configured to discharge and suction a hydraulic pressure depending on a rotational force of the motor, and a power transmission unit configured to deliver the rotational force of the motor to the gear pump; a hydraulic control unit having first and second hydraulic circuits, configured to receive the hydraulic pressure by a force generated by the hydraulic pressure supply device to control hydraulic pressure flows delivered to wheel cylinders provided on wheels; and an electronic control unit configured to control the motor and valves based on hydraulic pressure information and pedal displacement information, wherein the gear pump includes a first gear pump connected to the connected to the first hydraulic circuit through a first hydraulic passage and a second gear pump connected to the second hydraulic circuit through a second hydraulic passage.

Also, the first and second gear pumps may be connected to the reservoir, respectively.

Further, the electronic brake system may further include a balance valve arranged between the first and second hydraulic passages to connect and disconnect the first and second hydraulic passages.

Furthermore, the balance valve may be provided with a normally closed type solenoid valve that is closed in a normal operating state and is opened when receiving an opening signal.

Also, the electronic brake system may further include a first dump valve provided on a passage connecting the first hydraulic passage to the reservoir and a second dump valve provided on a passage connecting the second hydraulic passage to the reservoir.

Further, the first and second dump valves may be provided with a normally closed type solenoid valve that is closed in a normal operating state and is opened when receiving an opening signal.

Furthermore, the electronic brake system may further include a first backup passage configured to connect the first hydraulic port to the first hydraulic circuit so as to directly provide the oil to the wheel cylinders when the electronic brake system is abnormally operated, a second backup passage configured to connect the second hydraulic port to the second hydraulic circuit, a first cut valve provided on the first backup passage to control an oil flow, and a second cut valve provided on the second backup passage to control an oil flow.

Also, the first and second cut valves may be provided with a normally opened type solenoid valve that is opened in a normal operating state and is closed when receiving a closing signal from the electronic control unit.

Further, the hydraulic control unit may include inlet valves, each of which is provided on an upstream side of each of the wheel cylinders so as to control the hydraulic pressure flowing into the wheel cylinder installed on each of the wheels.

Furthermore, the hydraulic control unit may further include a plurality of outlet valves configured to independently control hydraulic pressure flows discharged from the wheel cylinders, and the respective outlet valves may be connected to the reservoir.

Also, the inlet valves may be provided with a normally opened type solenoid valve that is opened in a normal operating state and is closed when receiving a closing signal from the electronic control unit.

Further, the outlet valves may be provided with a normally closed type solenoid valve that is closed in a normal operating state and is opened when receiving an opening signal.

The electronic brake system according to one embodiment of the present invention is capable of providing a required hydraulic pressure continuously and constantly as well as a precise pressure control through a gear pump provided in a hydraulic pressure supply device.

Also, the electronic brake system of the present invention has an advantage capable of minimizing a number of valves controlling hydraulic pressure flows to implement a simplified configuration rather than the general brake system. Therefore, a size of a brake system, that is, a modulator block in which valves are installed may be reduced to realize a low manufacturing cost.

Further, the electronic brake system of the present invention has an effect capable of controlling the motor by interlocking with the valves to implement a precise pressure control. In addition, the electronic brake system of the present invention has another advantage capable of configuring and independently controlling two hydraulic circuits, each of which is connected two wheels, and performing an interlock control on the hydraulic pressure supply device depending on a pressure required to each wheel and a priority determination logic, thereby increasing a control range.

Furthermore, according to the electronic brake system of the present invention, when the brake system is failed, the pedal effort of the driver is directly delivered to the master cylinder to perform the braking of a vehicle, thereby stably providing the braking force.

BRIEF DESCRIPTION OF THE DRAWINGS

The present invention will be described in detail with reference to the following drawings, and since the following drawings deal with preferred embodiments of the present invention, therefore the spirit of the present invention should not by limited to the following drawings.

DETAILED DESCRIPTION

Hereinafter, embodiments of the present invention will be described in detail with reference to the accompanying drawings. Exemplary embodiments described herein are provided in order to fully provide the spirit of the invention to those skilled in the art. Therefore, the present invention should not be construed as limited to the embodiments set forth herein and may be accomplished in other various embodiments. Parts irrelevant to description are omitted in the drawings in order to clearly explain the present invention. The sizes of the elements in the drawings may be exaggerated in order to facilitate understanding.

Figure 1:
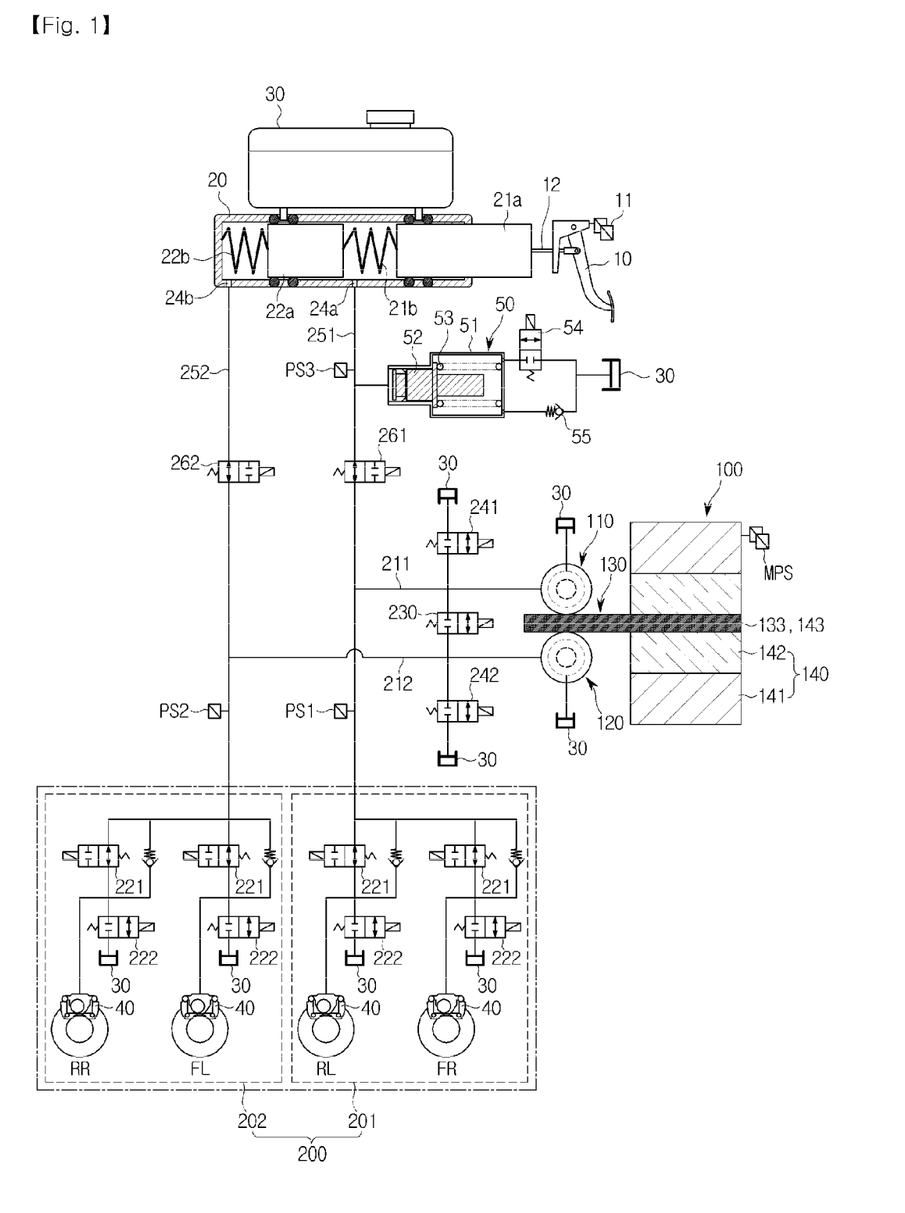
FIG. 1 is a hydraulic circuit diagram illustrating a non-braking state of an electronic brake system according to one exemplary embodiment of the present invention.

FIG. 1 is a hydraulic circuit diagram illustrating a non-braking state of an electronic brake system according to one exemplary embodiment of the present invention.

With reference to FIG. 1, an electronic brake system is generally equipped with a master cylinder 20 for generating a hydraulic pressure, a reservoir 30 coupled to an upper side of the master cylinder 20 to store oil, an input rod 12 for pressing the master cylinder 20 depending on a pedal effort of a brake pedal 10, a wheel cylinder 40 for receiving a hydraulic pressure to perform a braking operation on each wheel RR, RL, FR, and FL, a pedal displacement sensor 11 for sensing a displacement of the brake pedal 10, and a simulation device 50 for providing a reaction force depending on the pedal effort of the brake pedal 10.

Here, the master cylinder 20 may be made with at least one chamber to generate a hydraulic pressure, but according to the drawing, it is made with a first piston 21*a* and a second piston 22*a* to have two chambers and the first piston 21*a* is in contact with the input rod 12. The reason why the master cylinder 20 has the two chambers is for securing the safety when failed. For example, one of the two chambers is connected to a front right wheel FR and a rear left wheel RL, and the other chamber is connected to a front left wheel FL and a rear right wheel RR. Contrarily, one of the two chambers may be connected to two front right and left wheels FR and FL, and the other chamber may be connected to two rear right and left wheels RR and RL. As described above, configuring the two chambers independently may enable the braking of a vehicle even when one of the two chambers is failed. In the master cylinder 20, first and second hydraulic ports 24*a* and 24*b* through which hydraulic pressure is discharged from the two chambers are formed.

Also, a first spring 21*b* is disposed between the first piston 21*a* and the second piston 22*a* of the master cylinder 20, and a second spring 22*b* is provided between the second piston 22*a* and an end of the master cylinder 20. That is, the first spring 21*b* and the second spring 22*b* are provided in the two chambers, respectively, so that an elastic force is stored as the first piston 21*a* and the second piston 22*a* are compressed. The elastic force pushes the first and second pistons 21a and 22a to restore their original positions when a force pushing the first piston 21a is less than the elastic force.

Meanwhile, the input rod 12 for pressing the first piston 21a of the master cylinder 20 tightly contact the first piston 21a, so that there is no gap between the master cylinder 20 and the input rod 12. That is, when the brake pedal 10 is stepped on, the master cylinder 20 is directly pressurized without a pedal dead stroke section.

The simulation device 50 for providing the reaction force depending on the pedal effort of the brake pedal 10 is connected to a first backup passage 251 to be described. As shown in the drawing, the simulation device 50 includes a simulation chamber 51 provided for storing oil discharged from the first hydraulic port 24a of the master cylinder 20, a reaction force piston 52 provided in the simulation chamber 51, a pedal simulator equipped with a reaction force spring 53 for elastically supporting the reaction force piston 52, and a simulation valve 54 connected to a rear end of the simulation chamber 51. Here, the simulation chamber 51 is installed to have displacement in a predetermined range according to oil flowing into the simulation chamber 51 by the reaction force piston 52 and the reaction force spring 53.

The simulation valve 54 is made to connect the rear end of the simulation chamber 51 to the reservoir 30. That is, an inlet of the simulation chamber 51 is connected to the master cylinder 20, the rear end of the simulation chamber 51 is connected to the simulation valve 54, and the simulation valve 54 is connected to the reservoir 30, so that the pedal simulator, i.e., an inside of the simulation chamber 51, is totally filled with the oil.

The simulation valve 54 is made with a normally closed type solenoid valve maintaining a closed state at ordinary time and is opened to deliver brake oil to the simulation chamber 51 when a driver steps on the brake pedal 10.

Also, a simulation check valve 55 is installed to be parallel with the simulation valve 54. The simulation check valve 55 is made so that oil flows from the reservoir 30 to the simulation chamber 51 only. That is, the reaction force piston 52 of the pedal simulator compresses the reaction force spring 53 so that the oil in the simulation chamber 51 is delivered to the reservoir 30 through the simulation valve 54. As a result, since it is a state in which the oil is filled in the simulation chamber 51, friction of the reaction force piston 52 is minimized when the simulation device 50 operate, so that the durability of the simulation device 50 is improved as well as the simulation device 50 has a structure in which the inflow of foreign materials is blocked from the outside.

Furthermore, when the pedal effort of the brake pedal 10 is released, the oil is supplied to the simulation chamber 51 through the simulation check valve 55, and thus a rapid return of pressure of the pedal simulator is assured.

The electronic brake system according to the embodiment of the present invention includes a hydraulic pressure supply device 100 for receiving a driver's intention to brake in the form of an electrical signal from the pedal displacement sensor 11 for sensing a displacement of the brake pedal 10 to be mechanically operated, a hydraulic control unit 200 provided with first and second hydraulic circuits 201 and 202, each of which is equipped with two wheels, controlling a hydraulic pressure flow delivered to the wheel cylinder 40 provided on each wheel RR, RL, FR, and FL, a first cut valve 261 provided on the first backup passage 251 for connecting the first hydraulic port 24a to the first hydraulic circuit 201 to control a hydraulic pressure flow, a second cut valve 262 provided on the second backup passage 252 for connecting the second hydraulic port 24b to the second hydraulic circuit 202 to a control hydraulic pressure flow, and an electronic control unit (not shown) for controlling the hydraulic pressure supply device 100 and valves 54, 221, 222, 230, 241, 242, 261, and 262 based on hydraulic pressure information and pedal displacement information.

The hydraulic pressure supply device 100 is equipped with a motor 140 for generating a rotational force according to an electrical signal of the pedal displacement sensor 11, gear pumps 110 and 120 for discharging or suctioning the hydraulic pressure according to the rotational force of the motor 140, and a power transmission unit 130 for delivering the rotational force of the motor 140 to the gear pumps 110 and 120.

As the motor 140 is an electric motor for generating the rotational force according to a signal output from the electronic control unit (not shown), and the motor 140 is equipped with a stator 141, a rotor 142, and a rotating shaft 143 coupled with the rotor 142 to generate the rotational force in a forward or backward direction under the control of the electronic control unit. Since the motor 140 has been well known in the general art, the detailed description thereof will be omitted.

The gear pumps 110 and 120 are connected to the respective hydraulic circuits 201 and 202 of the hydraulic control unit 200, which are to be described below, to discharge or suction the hydraulic pressure to and from the respective hydraulic circuits 201 and 202. That is, the gear pumps 110 and 120 are made with a first gear pump 110 connected to the first hydraulic circuit 201 and a second gear pump 120 connected to the second hydraulic circuit 202. In particular, with reference to FIGS. 2 and 3, the gear pumps 110 and 120 are equipped with casings 113 and 123, each of which has an accommodation space provided therein, driving gears 115 and 125 disposed in the casings 113 and 123 and rotated by receiving the rotational force through the power transmission unit 130, and driven gears 116 and 126 rotated by being interlocked with the driving gears 115 and 125. Here, the first and second gear pumps have the same structure.

Figure 2:
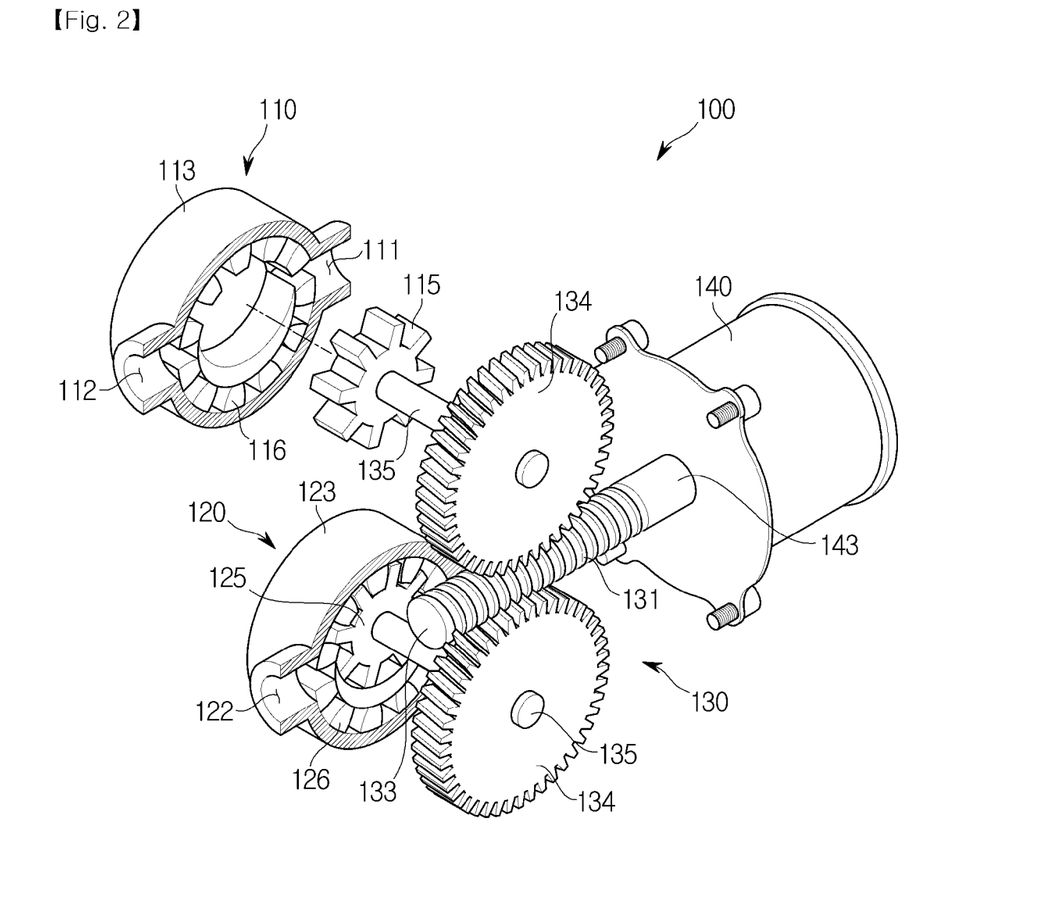
FIG. 2 is a perspective view illustrating a selected portion of a hydraulic pressure supply device provided in the electronic brake system according to one exemplary embodiment of the present invention.
Figure 3:
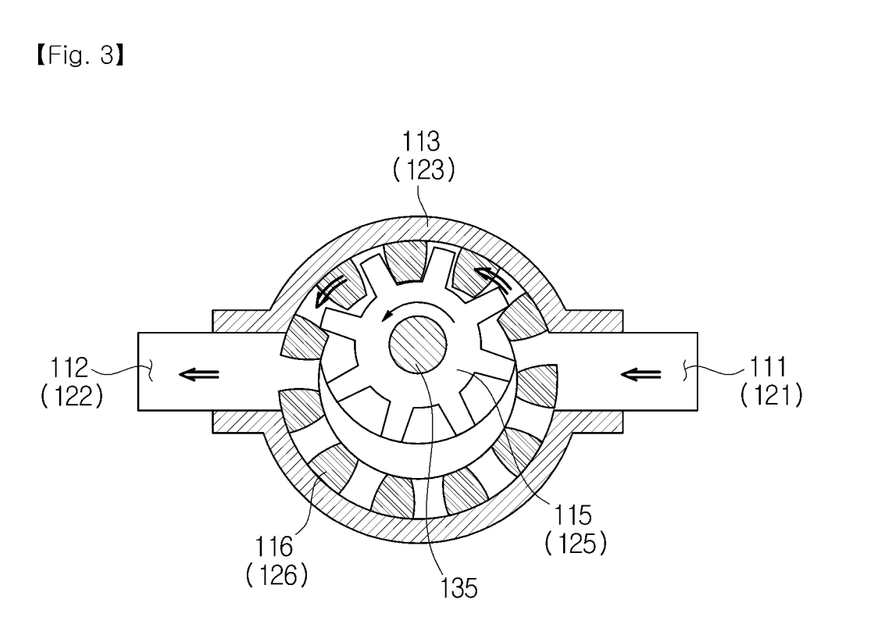
FIG. 3 is a cross-sectional view illustrating an operation state of a gear pump provided in the hydraulic pressure supply device of FIG. 2.

First ports 111 and 121 and second ports 112 and 122 for suctioning or discharging the hydraulic pressure are provided on the casings 113 and 123. The first ports 111 and 121 are connected to the reservoir 30, and the second ports 112 and 122 are connected to the first and second hydraulic circuits 201 and 202 through first and second hydraulic passages 211 and 212. That is, the first ports 111 and 121 and the second ports 112 and 122 suction or discharge the hydraulic pressure depending on rotational directions of the driving gears 115 and 125 and the driven gears 116 and 126 which are rotated by the rotational force of the motor 140. For example, when the hydraulic pressure is delivered to the first and second hydraulic circuits 201 and 202, the first ports 111 and 121 serve as an inlet and the second ports 112 and 122 serve as an outlet. Contrarily, when the hydraulic pressure delivered to each hydraulic circuit 201 and 202 is suctioned, the second ports 112 and 122 serve as the inlet and the first ports 111 and 121 serve as the outlet.

As shown, the driving gears 115 and 125 and the driven gear 116 and 126 provided within the casings 113 and 123 have a combination structure of internal gears. That is, the driving gears 115 and 125, which are rotated by receiving the rotational force from the power transmission unit 130, are rotated by being interlocked with gear teeth provided on inner sides of the driven gears 116 and 126. At this time, the oil flowing into the casings 113 and 123 is discharged through gaps and cracks due to differences in numbers of gear teeth between the driving gears 115 and 125 and the driven gears 116 and 126. Therefore, a required amount of fluid may be provided continuously and constantly.

The power transmission unit 130 is integrally formed with the rotating shaft 143, and equipped with a worm shaft 133 having a worm 131 formed on an outer circumference thereof, worm wheels 134 interlocked with the worm 131, and driving shafts 135 coupled to the centers of the worm wheels 134.

As shown in the drawing, the worm shaft 133 is integrally formed with the rotating shaft 143. That is, the worm shaft 133 is rotated according to revolution of the rotating shaft 143, and thus the worm wheels 134 are rotated by being interlocked with the worm 131 by receiving the rotational force. At this time, the worm wheels 134 are made in a pair to deliver the rotational force to the first and second gear pumps 110 and 120, respectively. That is, the driving shafts 135 installed on the centers of the worm wheels 134 are provided on the centers of the driving gears 115 and 125 of the gear pumps 110 and 120, so that the driving gears 115 and 125 are rotated together with the revolution of the worm wheels 134.

The hydraulic pressure supply device 100 serves to deliver the hydraulic pressure to the wheel cylinders 40 or to suction and deliver the hydraulic pressure to the reservoir 30 depending on a rotational direction of the rotational force generated from the motor 140.

Although it has been shown and explained that the gear pumps 110 and 120 have the internal gear structure, but they are not limited thereto, and it should be understood that any gear assembly structure such as an external gear structure, and the like may be used if a gear assembly structure is capable of receiving the rotational force to suction or discharge the hydraulic pressure.

Referring back to FIG. 1, the hydraulic control unit 200 is made with the first hydraulic circuit 201 and the second hydraulic circuit 202, each of which receives the hydraulic pressure to control two wheels. As shown, the front right wheel FR and the rear left wheel RL may be controlled by the first hydraulic circuit 201, and the front left wheel FL and the rear right wheel RR may be controlled by the second hydraulic circuit 202. The wheel cylinder 40 is installed on each wheel FR, FL, RR, and RL to receive the hydraulic pressure, thereby performing a braking operation. That is, the hydraulic control unit 200 receives the hydraulic pressure from the hydraulic pressure supply device 100 through the first hydraulic passage 211 for connecting the first hydraulic circuit 201 to the first gear pump 110, and the second hydraulic passage 212 for connecting the second hydraulic circuit 202 to the second gear pump 120, and each hydraulic circuit 201 and 202 is equipped with multiple inlet valves 221 to control a hydraulic pressure flow.

Two inlet valves 221 are provided in the first hydraulic circuit 201 to be connected to the first hydraulic passage 211, thereby independently controlling the hydraulic pressure delivered to two wheel cylinders 40. Also, two inlet valves 221 are provided in the second hydraulic circuit 202 to be connected to the second hydraulic passage 212, thereby independently controlling the hydraulic pressure delivered to two wheel cylinders 40. These multiple inlet valves 221 are disposed at an upstream side of the respective wheel cylinders 40 and made with a normally opened type solenoid valve that is opened at ordinary time and is closed when receiving a closing signal.

Also, for improving a brake release performance, the hydraulic control unit 200 is further equipped with the multiple outlet valves 222 connected to the reservoir 30. Each outlet valve 222 is connected to the wheel cylinder 40 to control a discharge of the hydraulic pressure from the respective wheels RR, RL, FR, and FL. That is, when a brake pressure of each wheel RR, RL, FR, and FL is measured and a decompression brake is required, the outlet valves 222 are selectively opened to control the brake pressure. The outlet valves 222 are made with a normally closed type solenoid valve that is closed at ordinary time and is opened when receiving an opening signal.

Meanwhile, the electronic brake system according to one embodiment of the present invention is equipped with a balance valve 230 that controls a balance between the pressures provided to the first and second hydraulic circuits 201 and 202 when there is a pressure unbalance according to an assembly tolerance or size difference of each gear pump 110 and 120 of the hydraulic pressure supply device 100, or there is a deviation between hydraulic pressure delivered to the first and second hydraulic circuits 201 and 202. The balance valve 230 is provided on a passage for connecting a first hydraulic passage 211 to a second hydraulic passage 212 to connect or disconnect the first and second hydraulic passages 211 and 212 according to open and close operations. The balance valve 230 is made with a normally closed type solenoid valve that is closed at ordinary time and is opened when receiving an opening signal.

Also, according to an aspect of the present invention, the electronic brake system is equipped with a first dump valve 241 provided on a passage for connecting the first hydraulic passage 211 to the reservoir 30, and a second dump valve 242 provided on a passage for connecting the second hydraulic passage 212 to the reservoir 30. The first and second dump valves 241 and 242 are independently controlled and made with a normally closed type solenoid valve that is closed at ordinary time and is opened when receiving an opening signal. The first and second dump valves 241 and 242 are selectively opened and closed according to a required pressure to control hydraulic pressure flows being delivered to the wheel cylinders 40. For example, when a hydraulic pressure should be delivered to the wheel cylinders 40 provided on the second hydraulic circuit 202 only, the first dump valve 241 is opened to deliver a hydraulic pressure discharged through the gear pump 110 to the reservoir 30 rather than the first hydraulic circuit 201. Such operation structures of the first and second dump valves 241 and 242 will be described again in below.

According to an aspect of the present invention, the first and second backup passages 251 and 252 are provided to directly supply the oil from the master cylinder 20 to the wheel cylinders 40 when the electronic brake system is operated abnormally. In particular, the first cut valve 261 for controlling an oil flow is provided on the first backup passage 251, and the second cut valve 262 for controlling an oil flow is provided on the second backup passage 252. Also, the first backup passage 251 connects the first hydraulic port 24a to the first hydraulic circuit 201, and the second backup passage 252 connects the second hydraulic port 24b to the second hydraulic circuit 202. As shown, the first and second backup passages 251 and 252 are connected to both ends, i.e., an inlet and an outlet, of the balance valve 230, which are connected to the first and second hydraulic passages 211 and 212 of the first and second hydraulic circuits 201 and 202. Operation structures of the first and second cut valves 261 and 262 will be described again in below.

The first and second cut valves 261 and 262 are made with a normally opened type solenoid valve that is opened at ordinary time and is closed when receiving a closing signal from the electronic control unit.

Meanwhile, reference numerals, which are not described, i.e., 'PS1' is a first pressure sensor for sensing a hydraulic pressure of the first hydraulic circuit 201, 'PS2' is a second pressure sensor for sensing a hydraulic pressure of the second hydraulic circuit 202, 'PS3' is a third pressure sensor for sensing an oil pressure of the master cylinder 20, and 'MPS' is a motor control sensor for controlling a rotational angle or current of the motor 140.

Hereinafter, an operation of the electronic brake system according to a preferred embodiment of the present invention will be described in detail.

Figure 4:
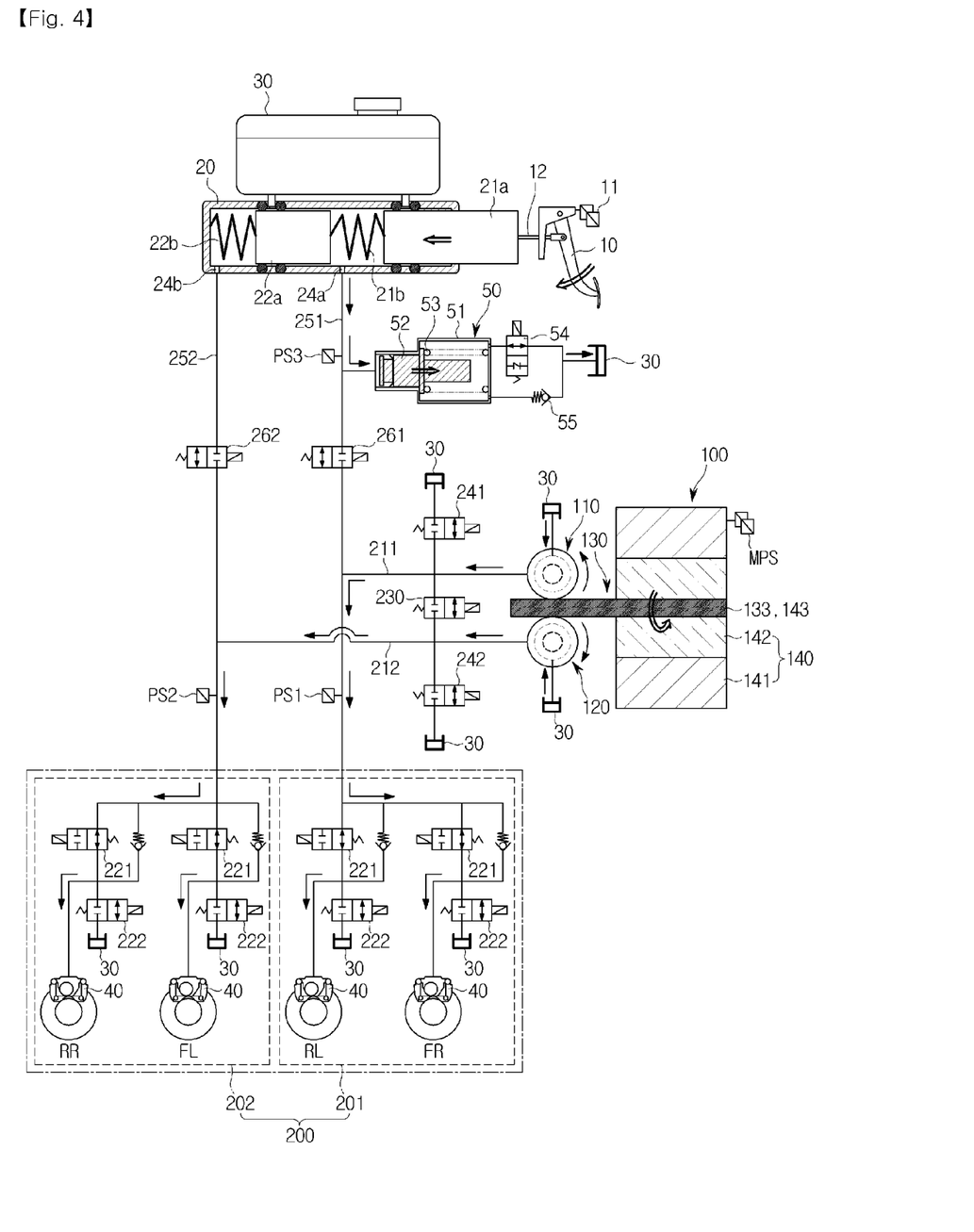
FIG. 4 is a hydraulic circuit diagram illustrating a normal braking state of the electronic brake system according to one exemplary embodiment of the present invention.

FIG. 4 is a hydraulic circuit diagram illustrating a normal operating state of the electronic brake system.

With reference to FIG. 4, when a driver begins braking, an amount of braking requested by the driver may be measured based on information such as a pressure of the brake pedal 10 being put by the driver through the pedal displacement sensor 11. The electronic control unit (not shown) receives an electrical signal output from the pedal displacement sensor 11 to operate the motor 140. Also, the electronic control unit may receive an amount of regenerative braking through the third pressure sensor PS3 provided on the outlet of the master cylinder 20 and the first and second pressure sensors PS1 and PS2 provided on the first and second hydraulic circuits 201 and 202, and calculate an amount of friction braking based on a difference between the amount of braking requested by the driver and the amount of regenerative braking, thereby sensing a raising or reducing amount of pressure of the wheel.

Specifically, when the driver puts on the brake pedal 10 at the beginning of braking, the motor 140 is operated and a rotational force of the motor 140 is delivered to the gear pumps 110 and 120 through the power transmission unit 130, and thus the oil suctioned from the reservoir 30 through the first ports 111 and 121 is discharged to the second port 112 and 122. That is, the first and second gear pumps 110 and 120 accommodate the oil on the gaps and the cracks between gear teeth of the driving gears 115 and 125 rotated together with the worm wheels 134 of the power transmission unit 130 and the driven gears 116 and 126 rotated by being interlocked with the driving gears 115 and 125, thereby directing the oil from the first ports 111 and 121 to the second ports 112 and 122. At this time, the oil delivered to the wheel cylinder 40 generates the rotational force of the motor 140 corresponding to a pedal stroke, sand thus the first and second gear pumps 110 and 120 may generate the pressure as well as provide continuously and constantly a required amount of the oil.

When a hydraulic pressure is generated using the hydraulic pressure supply device 100, the first and second cut valves 261 and 262, which are installed on the first and second backup passages 251 and 252 connected to the first and second hydraulic ports 24a and 24b of the master cylinder 20, are closed so that the hydraulic pressure generated at the master cylinder 20 is not delivered to the wheel cylinders 40.

Also, the hydraulic pressure generated from the gear pumps 110 and 120 is delivered to the wheel cylinder 40 installed on each wheel RR, RL, FR, and FL according to the opening of the inlet valves 221 to generate the braking force. At this time, when a deviation between the pressure delivered to the first and second hydraulic circuits 201 and 202 occurs, controlling equalization of the pressure of the first and second hydraulic circuits 201 and 202 may be realized by opening the balance valve 230.

Meanwhile, the pressure generated according to a pressurization of the master cylinder 20 corresponding to the pedal effort of the brake pedal 10 is delivered to the simulation device 50 connected to the master cylinder 20. At this time, the simulation valve 54 of a normally closed type arranged on the rear end of the simulation chamber 51 is opened so that the oil filled in the simulation chamber 51 is delivered to the reservoir 30 through the simulation valve 54. Also, the reaction force piston 52 is moved and a pressure corresponding to a weight of the reaction force spring 53 supporting the reaction force piston 52 is generated in the simulation chamber 51 to provide appropriate pedal feel to the driver.

Figure 5:
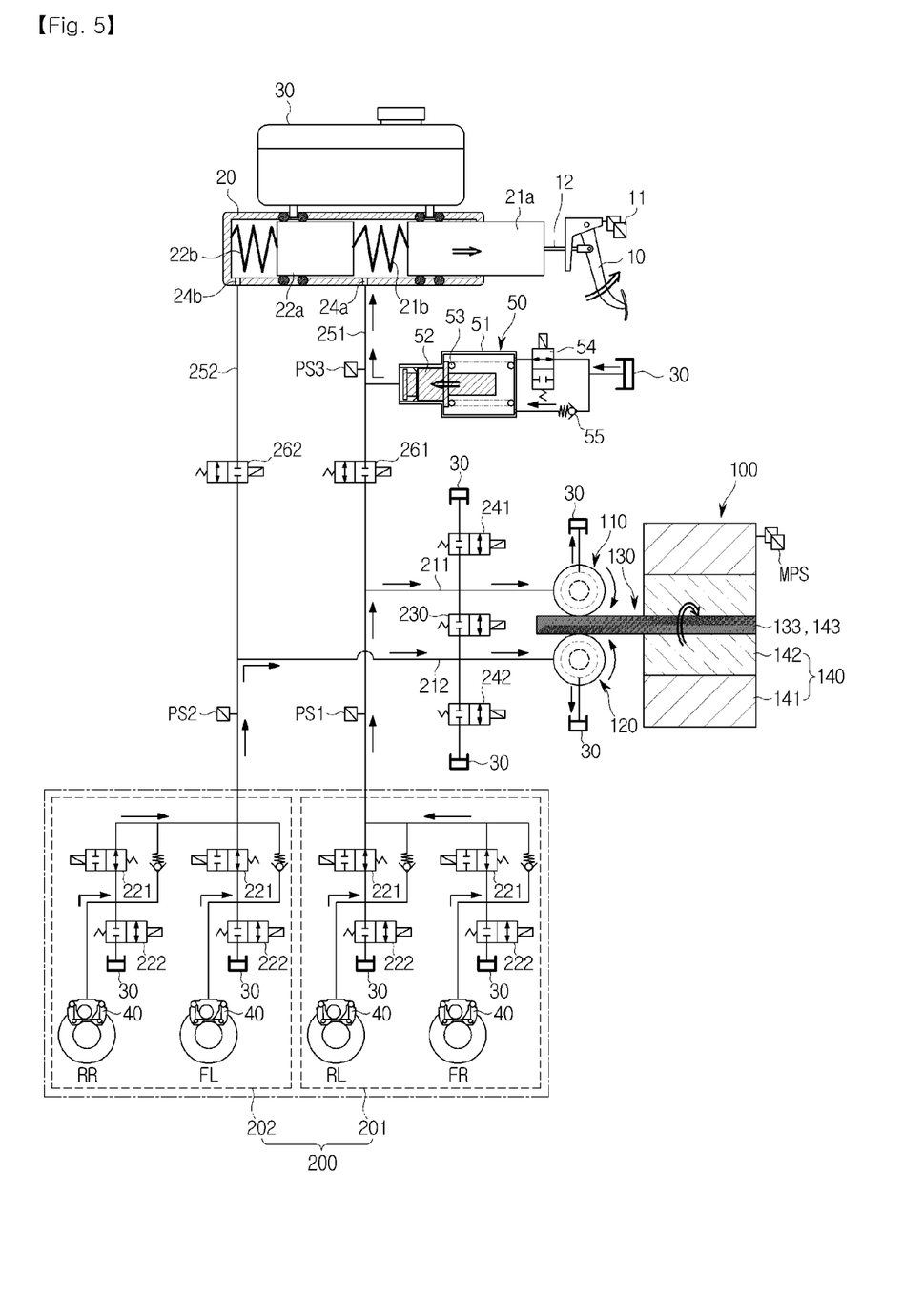
FIG. 5 is a hydraulic circuit diagram illustrating a normal braking release state of the electronic brake system according to one exemplary embodiment of the present invention.

Next, releasing a brake retaining state of the electronic brake system in a normal operating state will be described with reference to FIG. 5. As shown in FIG. 5, when the pedal effort applied to the brake pedal 10 is released, the motor 140 generates a rotational force in a direction opposite a braking force to deliver the generated rotational force to the gear pumps 110 and 120. At this time, the driving gears 115 and 125 and the driven gears 116 and 126, which are provided on the gear pumps 110 and 120, are rotated in a direction opposite a braking force to receive the hydraulic pressure discharged from the wheel cylinders 40 through the first and second hydraulic passages 211 and 212 and to deliver the received hydraulic pressure to the reservoir 30. Further, the inlet valves 221, the outlet valves 222, the first and second dump valves 241 and 242, and the balance valve 230 are controlled in opening and closing operation states that are identical to those of the brake retaining state. That is, the outlet valves 222, the first and second dump valves 241 and 242, and the balance valve 230 are closed, whereas the inlet valves 221 are opened. Therefore, the hydraulic pressure discharged from the wheel cylinders 40 of the first and second hydraulic circuits 201 and 202 is delivered to the reservoir 30 through the gear pumps 110 and 120 connected to the first and second hydraulic passages 211 and 212.

In the simulation device 50, the oil in the simulation chamber 51 is delivered to the master cylinder 20 according to returning of the reaction force piston 52 to its original position by the reaction force spring 53 and then oil is refilled in the simulation chamber 51 through the simulation valve 54 and the simulation check valve 55, which are connected to the reservoir 30, thereby a rapid return of pressure of the pedal simulator is assured.

Meanwhile, the electronic brake system according to one embodiment of the present invention may control the valves 54, 221, 222, 230, 241, 242, 261, and 262 provided therein depending on pressure required by the wheel cylinder 40 provided on each wheel RR, RL, FR, and FL of the first and second hydraulic circuits 201 and 202 to specify and control a control range. For example, FIG. 6 shows a case that only a corresponding wheel cylinder is braked while ABS operates, and thus a state of braking the wheels of the first hydraulic circuit 201 is illustrated.

Figure 6:
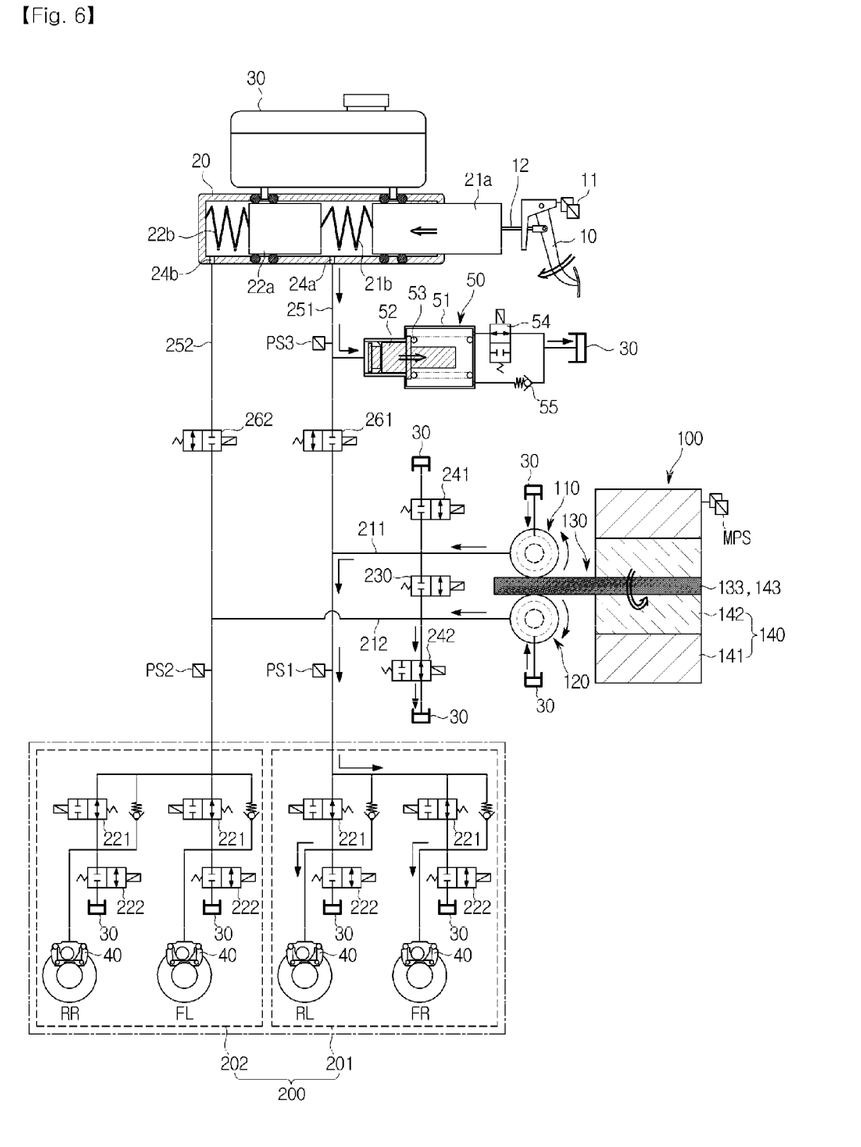
FIG. 6 is a hydraulic circuit diagram illustrating an ABS operation state using the electronic brake system according to one exemplary embodiment of the present invention.

With reference to FIG. 6, the motor 140 is operated depending on the pedal effort of the brake pedal 10 and a rotational force of the motor 140 is delivered to the first and second gear pumps 110 and 120 through the power transmission unit 130 to generate a hydraulic pressure. At this time, the first and second cut valves 261 and 262 are closed so that the hydraulic pressure generated at the master cylinder 20 is not delivered to the wheel cylinders 40. Also, the second dump valve 242 is opened, so that the hydraulic pressure discharged from the second gear pump 120 is not delivered to the second hydraulic circuit 202 whereas is delivered to the reservoir 30 through the second dump valve 242. Therefore, the hydraulic pressure discharged from the first gear pump 110 is delivered only to the wheel cylinders 40 of the front right wheel FR and the rear left wheel RL, which are provided on the first hydraulic circuit 201, through the first hydraulic passage 211.

As described above, the structure for controlling the hydraulic pressure delivered to the wheel cylinders 40 through opening and closing operations of the first and second dump valves 241 and 242 is one embodiment, and thus it should be understood that the electronic brake system according to the present invention may include a variety of control modules capable of raising or reducing the hydraulic pressure delivered to each wheel RL, RR, FL, and FR by independently opening and closing the inlet valves 221, the outlet valves 222, the first and second dump valves 241 and 242, and the balance valve 230. That is, the electronic brake system according to the present invention may independently control the motor 140 and the respective valves 54, 221, 222, 230, 241, and 242 to selectively deliver or discharge the hydraulic pressure to or from the wheel cylinder 40 of each wheel RL, RR, FL, and FR according to a required pressure, thereby precisely controlling the pressure.

Figure 7:
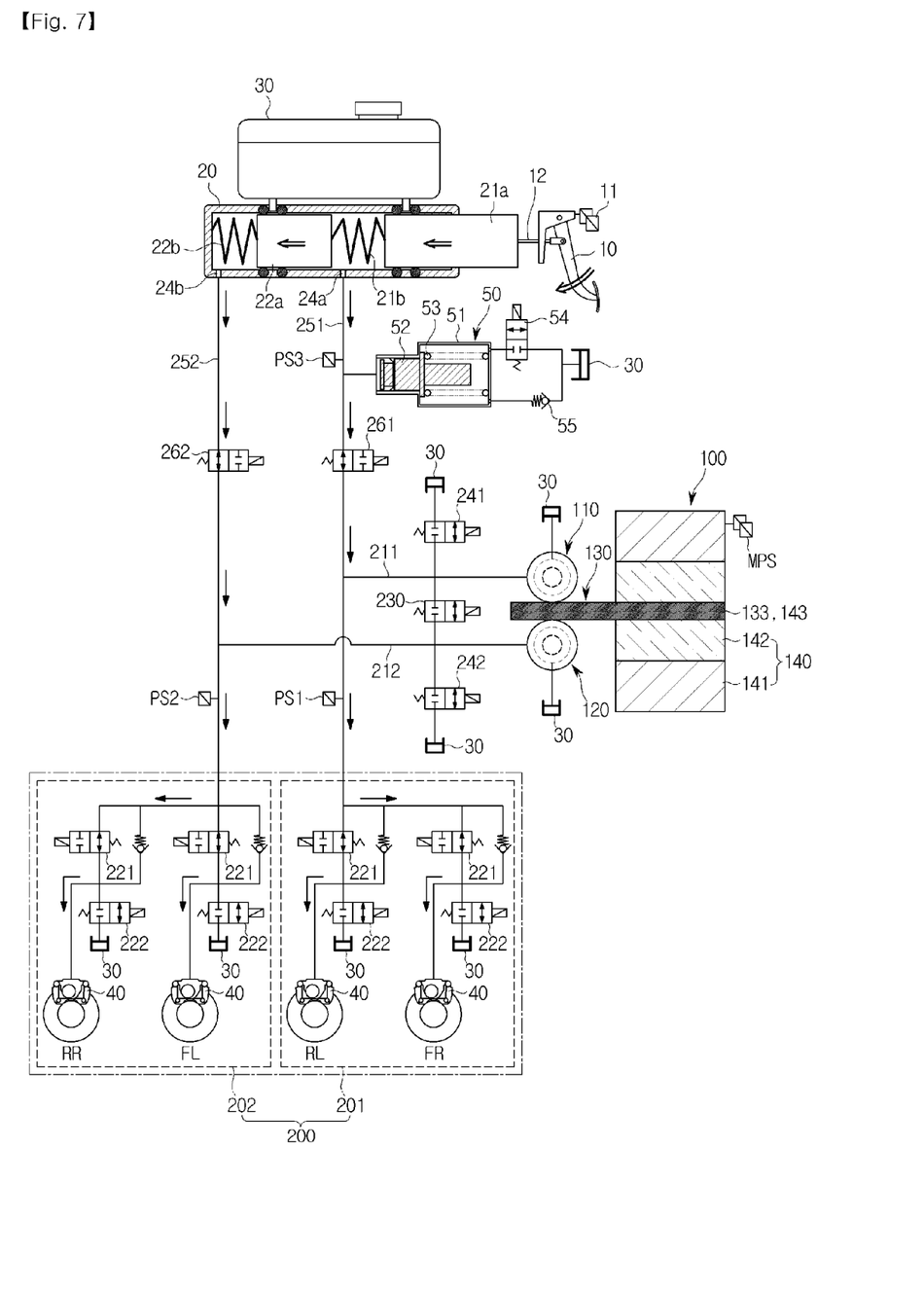
FIG. 7 is a hydraulic circuit diagram illustrating an abnormal operating state of the electronic brake system according to one exemplary embodiment of the present invention.

The electronic brake system, which is operated abnormally, will be described. With reference to FIG. 7, when the electronic brake system is operated abnormally, the respective valves 54, 221, 222, 230, 241, 242, 261, and 262 are set to the beginning state of braking, that is, a non-operating state. And, when the driver presses the brake pedal 10, the input rod 12 connected to the brake pedal 10 is advanced toward a left direction, and simultaneously, the first piston 21a contacted with the input rod 12 is advanced toward the left direction as well as the second piston 22a by the first piston 21a. At this time, since there is no gap between the input rod 12 and the first piston 21a, the braking may be performed rapidly. That is, the hydraulic pressure generated by the master cylinder 20 being pressurized is delivered to the wheel cylinders 40 through the first and second backup passages 251 and 252 that are connected for the purpose of a backup braking, so that the braking force is realized. Here, the first and second cut valves 261 and 262 installed on the first and second backup passages 251 and 252 and the inlet valve 221 provided on the upstream side of each wheel RR, RL, FR, and FL are made with a normally opened type solenoid valve, and the simulation valve 54, the first and second dump valves 241 and 242, and the balance valve 230 are made with a normally closed type solenoid valve, so that the hydraulic pressure is directly delivered to the wheel cylinders 40. Therefore, the braking is stably realized to improve the safety of braking.

Although a few embodiments of the present invention have been shown and described, but they are not limited thereto, it would be appreciated by those skilled in the art that changes may be made in these embodiments without departing from the principles and spirit of the invention, the scope of which is defined in the claims and their equivalents.

What is claimed is:

1. An electronic brake system, which includes a reservoir storing oil, a master cylinder having first and second hydraulic ports and coupled to the reservoir so as to receive the oil, a pedal displacement sensor sensing a displacement of a brake pedal, and a simulation device connected to the master cylinder to provide a reaction force corresponding to a pedal effort of the brake pedal, comprising:
    a hydraulic pressure supply device having a motor configured to operate by receiving an electrical signal from the pedal displacement sensor when the brake pedal is operated, a gear pump configured to discharge and suction a hydraulic pressure depending on a rotational force of the motor, and a power transmission unit configured to deliver the rotational force of the motor to the gear pump;
    a hydraulic control unit having first and second hydraulic circuits configured to receive the hydraulic pressure by a force generated by the hydraulic pressure supply device to control hydraulic pressure flows delivered to wheel cylinders provided on wheels;
    an electronic control unit configured to control the motor and valves based on hydraulic pressure information and pedal displacement information;
    a first dump valve provided on a passage connecting the first hydraulic passage to the reservoir; and
    a second dump valve provided on a passage connecting the second hydraulic passage to the reservoir,
    wherein the gear pump includes:
    a first gear pump having one end connected to the first hydraulic circuit through a first hydraulic passage and the other end connected to the reservoir; and
    a second gear pump having one end connected to the second hydraulic circuit through a second hydraulic passage and the other end connected to the reservoir,
    the electronic brake system further comprising:
    a balance valve arranged between the first and second hydraulic passages to connect and disconnect the first and second hydraulic passages,
    wherein the balance valve is opened to control such that hydraulic pressures delivered to the first and second hydraulic circuits are the same when a deviation occurs between the hydraulic pressure delivered to the first and second hydraulic circuits through the first and second gear pumps.

2. The electronic brake system according to claim 1, wherein the balance valve is provided with a normally closed type solenoid valve that is closed in a normal operating state and is opened when receiving an opening signal.

3. The electronic brake system according to claim 1, wherein the first and second dump valves are provided with a normally closed type solenoid valve that is closed in a normal operating state and is opened when receiving an opening signal.

4. The electronic brake system according to claim 1, further comprising:
    a first backup passage configured to connect the first hydraulic port to the first hydraulic circuit so as to directly provide the oil to the wheel cylinders when the electronic brake system is abnormally operated;
    a second backup passage configured to connect the second hydraulic port to the second hydraulic circuit;
    a first cut valve provided on the first backup passage to control an oil flow; and
    a second cut valve provided on the second backup passage to control an oil flow.

5. The electronic brake system according to claim 4, wherein the first and second cut valves are provided with a normally opened type solenoid valve that is opened in a normal operating state and is closed when receiving a closing signal from the electronic control unit.

6. The electronic brake system according to claim 1, wherein the hydraulic control unit includes inlet valves, each of which is provided on an upstream side of each of the wheel cylinders so as to control the hydraulic pressure flowing into the wheel cylinder installed on each of the wheels.

7. The electronic brake system according to claim 6, wherein the hydraulic control unit further includes a plurality of outlet valves configured to independently control hydraulic pressure flows discharged from the wheel cylinders, wherein the respective outlet valves are connected to the reservoir.

8. The electronic brake system according to claim 7, wherein the outlet valves are provided with a normally closed type solenoid valve that is closed in a normal operating state and is opened when receiving an opening signal.

9. The electronic brake system according to claim 6, wherein the inlet valves are provided with a normally opened type solenoid valve that is opened in a normal operating state and is closed when receiving a closing signal from the electronic control unit.

10. The electronic brake system according to claim 1, wherein the electronic brake system controls that the motor is rotated in one direction by receiving an electrical signal for the braking from the pedal displacement sensor when a driver pressurizes the brake pedal, the first gear pump receives the oil from the reservoir to discharge hydraulic pressure to the first hydraulic passage, and the second gear pump receives the oil from the reservoir to discharge hydraulic pressure to the second hydraulic passage, and controls that the motor is rotated in a reverse direction with respect to the one direction by receiving an electrical signal for releasing a brake state from the pedal displacement sensor when the driver releases the pressurized brake pedal, the first gear pump delivers the oil from the first hydraulic passage to the reservoir, and the second gear pump delivers the oil from the second hydraulic passage to the reservoir.

* * * * *